United States Patent
Hennemann et al.

(10) Patent No.: US 6,409,815 B1
(45) Date of Patent: Jun. 25, 2002

(54) SURFACE-MODIFIED CONDUCTIVE PIGMENT

(75) Inventors: Alfred Hennemann, Pfungstadt; Manfred Kieser, Darmstadt, both of (DE)

(73) Assignee: Merck Patent Gesellschaft mit beschraenkter Haftung (DE)

( * ) Notice: Subject to any disclaimer, the term of this patent is extended or adjusted under 35 U.S.C. 154(b) by 0 days.

(21) Appl. No.: 08/417,017

(22) Filed: Apr. 5, 1995

(30) Foreign Application Priority Data

Apr. 6, 1994 (DE) .......................... 44 11 807

(51) Int. Cl.⁷ .................. C09C 1/62; C04B 14/26; B32B 5/16; H01B 1/00
(52) U.S. Cl. ............. 106/417; 106/403; 106/404; 106/418; 106/425; 106/429; 106/430; 106/431; 106/441; 106/442; 106/445; 106/446; 106/447; 106/448; 106/455; 106/460; 106/475; 106/490; 106/491; 428/403; 252/500; 252/512; 252/521
(58) Field of Search ................ 106/403, 404, 106/418, 425, 429, 430, 431, 441, 442, 445, 446, 447, 448, 455, 460, 475, 490, 491, 417; 428/403; 252/500, 512, 521

(56) References Cited

U.S. PATENT DOCUMENTS

| 4,655,966 | A | | 4/1987 | Guillaumon et al. | ...... 252/518 |
|---|---|---|---|---|---|
| 4,734,319 | A | * | 3/1988 | Doi et al. | ............. 427/214 |
| 4,888,135 | A | * | 12/1989 | Tsunaga et al. | ......... 252/514 |
| 4,976,890 | A | * | 12/1990 | Felter et al. | ............. 252/511 |
| 5,171,364 | A | | 12/1992 | Sato et al. | ............... 106/425 |
| 5,185,228 | A | * | 2/1993 | Maeda et al. | ............. 430/59 |
| 5,204,177 | A | * | 4/1993 | Sato et al. | ................ 428/328 |
| 5,310,612 | A | * | 5/1994 | Yashiki | ..................... 430/58 |
| 5,382,384 | A | * | 1/1995 | Baigrie et al. | ........... 252/514 |
| 5,523,157 | A | * | 6/1996 | Sasaki et al. | ............ 428/403 |
| 5,550,000 | A | * | 8/1996 | Takegawa et al. | ....... 430/131 |

FOREIGN PATENT DOCUMENTS

| DE | 40 17 044 | 11/1991 |
|---|---|---|
| DE | 40 41 663 | 6/1992 |
| EP | 139557 | 5/1985 |
| EP | 359569 | 3/1990 |
| EP | 441427 | 8/1991 |

* cited by examiner

Primary Examiner—Elizabeth D. Wood
(74) Attorney, Agent, or Firm—Millen, White, Zelano & Branigan, P.C.

(57) ABSTRACT

Surface-modified conductive pigment obtainable by partial coating of a conductive pigment with an organic modifying agent. The modifying agent is an organometallic compound of the elements silicon, tin, titanium, zirconium or aluminum. The pigment is prepared by dispersing a conductive pigment, subsequently adding the modifying agent, if appropriate as a mixture with a solvent, to the pigment dispersion, and in particular in an amount such that the powder electrical conductance of the partly coated conductive pigment is in the range between 80% of the starting value and $10^{-7}$ S, removing the solvent present, if appropriate, with further agitation and heating of the pigment to 100° C. and finally drying the partly coated pigment.

18 Claims, No Drawings

SURFACE-MODIFIED CONDUCTIVE PIGMENT

The invention relates to conductive pigments having a partly modified surface.

BACKGROUND OF THE INVENTION

Conductive pigments are usually metal powders, non-metallic powders, such as carbon black and doped metal oxides, or pulverulent carrier materials coated with conductive layers. The first group includes, for example, silver powder.

Examples of doped metal oxides are antimony-doped tin oxide, halogen-doped tin oxide or aluminum-doped zinc oxide, which are described in U.S. Pat. No. 4,655,966, EP 0 441 427 and U.S. Pat. No. 5,171,364.

Carrier materials which are used for the third group of conductive pigments are, inter alia, phyllosilicates, in particular mica, silicon dioxide, titanium dioxide and barium sulfate. These carrier materials are in general coated with a conductive layer of doped metal oxides. DE 40 17 044 describes an electrically conductive barium sulfate, the conductive layer of which comprises antimony-doped tin oxide. A conductive pigment comprising a mica and antimony-doped tin oxide is described in EP 0 139 557. Hollow beads of silicon dioxide coated with antimony-doped tin oxide are known from EP 0 359 569.

If the conductive pigments mentioned are incorporated into a non-conductive matrix, conductive composite materials are only obtained if the concentration in the total matrix lies above a critical concentration range at which the first conductivity pathways can form. This concentration range depends on the pigment and matrix. This range is also called the percolation threshold. It depends chiefly on the geometric shape and the density of the particles.

Conductive pigments are useful for addition to non-conductive materials, such as plastics, in order to make them antistatic or to make them conductive. When made antistatic, the materials do not conduct electric current; however, they prevent the accumulation of electrostatic charges because such charges can flow off the materials. The antistatic region lies between $10^6$ and $10^9$ ohms. At conductance above this antistatic region, the material is an insulator and, at conductance below this region, the material is electrically conductive.

Concentrations in the range of or above the percolation threshold are necessary for both the antistatic and electrically conductive regions.

In order to be able to establish a surface resistance of about 1 MΩ for a pigmented polyester material, about 30 to 50% by weight of conductive pigment, based on the resin employed, must be added. Thus, if Minatec® 30 CM (manufacturer: E. Merck, Darmstadt) is used, a surface resistance of 2 MΩ is achieved at a pigment content of 30% by weight. Minatec® 30 CM comprises mica coated with titanium oxide and antimony-doped tin oxide as the conductive layer.

If Sacon® P 401 (manufacturer: Sachtleben Chemie GmbH, Duisburg), a barium sulfate coated with antimony-doped tin oxide, is used, 50% by weight, based on the resin employed, is necessary to achieve a surface resistance of 20 MΩ.

However, such high pigment contents adversely affect the mechanical properties of the system to be used.

SUMMARY OF THE INVENTION

An object of the invention is to provide a conductive pigment which imparts an adequate conductivity to the pigmented system even at significantly below the normal percolation threshold.

Upon further study of the specification and appended claims, further objects and advantages of this invention will become apparent to those skilled in the art.

Accordingly, the invention provides a surface-modified conductive pigment which is obtainable by partial coating of a conductive pigment with an organic modifying agent. The partially coated conductive pigment is prepared by dispersing a conductive pigment, subsequently adding the organic modifying agent, if appropriate as a mixture with a solvent, to the pigment dispersion, and in particular in an amount such that the powder electrical conductance measured in "siemens" (S)=1/Ω, of the partly coated conductive pigment is about 80% or less, preferably 50% or less, of the starting value, but does not fall below a lower limit value of $10^{-7}$ S, preferably $10^{-5}$ S, removing the volatile reaction products and the solvent present, where appropriate, with further agitation and heating of the pigment to 100° C., and finally drying the partly coated pigment.

The invention also relates to coatings, thermoplastics, casting resins, printing inks and powder coatings pigmented with the pigment according to the invention.

All types of conductive pigments can be employed for partial coating with the modifying agents mentioned below, in particular metallic powders, such as, for example, silver powder and aluminum powder, and furthermore non-metallic powders, such as, for example, carbon black, carbon fibers, antimony-doped tin oxide, aluminum-doped zinc oxide or fluoride-doped tin oxide, and pulverulent substrates which are coated with conductive layers, such as, for example, mica, kaolin or barium sulfate coated with doped metal oxides.

Compounds with organic radicals which can be fixed onto the surface of conductive pigments can be employed as modifying agents. Suitable modifying agents include, for example, organometallic compounds of the elements tin, zirconium, titanium, aluminum and silicon; silanes being preferred. These agents can be used separately or as mixtures.

Particularly suitable compounds are those of the formula I

wherein the radicals $R^{1-4}$ have the following meanings:

$R^1$ and/or $R^2$ is alkyl having 1–30 C atoms, and in particular 10–30 C atoms, including cycloalkyl-containing alkyl groups, wherein one or two non-adjacent $CH_2$ groups can also be replaced by —CH=CH— and/or —O—, with decyl, undecyl, dodecyl, tridecyl, tetradecyl, pentadecyl, hexadecyl, heptadecyl, octadecyl, nonadecyl, eicosanyl, heneicosanyl, docasanyl, tricosanyl, tetracosanyl, pentacosanyl, hexacosanyl, heptacosanyl, octacosanyl, nonacosanyl, tricontanyl, 12,12-dimethyltetradecyl, 11-propyl-12-butylpentadecyl and 8,8-dimethyl-12-propyl-13-propylhexadecyl radicals being particularly preferred;

the remaining radicals $R^{1-4}$ (i.e., $R^2$–$R^4$ when $R^1$ is as defined above, $R^1$ and $R^3$–$R^4$ when $R^2$ is as defined above and $R^3$–$R^4$ when both $R^1$ and $R^2$ are as defined above) are halogen or alkoxy having 1–20 C atoms, in particular 1–10 C atoms, wherein one or two non-adjacent $CH_2$ groups can also be replaced by —CH=CH—, —O—, —CO—, —COO— or —OCO—; fluorine, chlorine, methoxy, ethoxy, propoxy, butoxy, pentoxy, hexoxy, heptoxy, octoxy, nonoxy or decoxy radicals are particularly preferred; and x is Si, Sn, Ti, Zr or Al, the radical $R^4$ being omitted in the case where X=Al.

Particularly preferred compounds are those of the formula $$(C_nH_{2n+1})X(OC_mH_{2m+1})p$$

wherein

X has the above-mentioned meaning, n is 1–30, m is 1–10, and p is 3 when X is Si, Sn, Ti or Zr, and 2 when X is Al.

Among these compounds, n-hexyldecyl-tri-ethoxysilane and methyl-tri-ethoxysilane are preferably employed as modifying agents in the context of the invention.

Silanes are known from EP 0 492 223 for coating pigments. The pigments described therein are used for inhibiting yellowing of plastics.

Partial coating of the conductive pigment is carried out by the process described in DE-OS 40 41 663. For this, the pigment and the modifying agent are mixed intensively in a high-performance mixer at temperatures of preferably about 50–100° C., if appropriate with addition of preferably about 1–50% by weight, especially 5–10% by weight, of solvent, based on the pigment. The mixing time is preferably about 1 hour.

If a solvent is used for the coating, then it serves merely for better distribution of the modifying agent on the pigment surface.

If silanes are used, it may be necessary to subject them to preliminary hydrolysis, because the silane does not react directly with the hydroxyl groups on the surface of the pigment. In this case, water and a solvent are added to the silane and the mixture is subjected to preliminary hydrolysis by stirring at room temperature for 30 minutes. After the coating operation, heat treatment of the partly coated pigment, preferably at about 50–200° C., is necessary after removal of the solvent.

Water and organic solvents, such as, for example, ketones, ethers and alcohols, are employed for the preliminary hydrolysis. The water and solvent are used in less than the equivalent amount, compared with the amount of pigment to be coated. However, the preliminary hydrolysis can also be carried out without a solvent, as described in DE 40 41 663.

It is decisive for the onset of the effect according to the invention that the surface of the conductive pigment is only partly covered by organic radicals. This partial covering of the pigment surface is achieved by continuing the coating operation until the powder electrical conductance of the partly coated conductive pigment is in the range between 80%, preferably 50%, of the starting value and not less than $10^{-7}$ S, preferably $10^{-6}$ S. This means that less covering agent is employed than is necessary to form a complete layer.

Compared with the amount needed for the formation of a complete layer, only 5 to 50% thereof, preferably 10 to 30%, is employed.

The amount of modifying agent depends on the desired conductivity, on the surface of the conductive pigment and on the density of the reactive groups on the surface thereof. The expert is capable of determining the optimum amount for the particular intended use by a few preliminary experiments.

While not intending to be bound by this theory, it is assumed that by partial modification of the pigment surface a certain incompatibility with the binder is effected and the pigment floats to or becomes concentrated on the surface of the coating material or of the coating. Under the influence of the surface tension between pigment and coating matrix, the pigment particles migrate to the surface of the coating matrix and combine there to form a film, which leads to the formation of a network close to the surface. In addition, however, a three-dimensional network also forms in the matrix, resulting in conductivity paths to the surface and within the matrix.

The floating of the pigment to or concentration of the pigment on the surface of the coating agent is called leafing power. It has previously been observed only in metallic effect pigments and described for pearl luster pigments in German Patent Application P 43 23 914.5.

However, because of the system, this property of the modified conductive pigments can be effective during use only if the matrix in which the pigment is employed remains liquid for a certain time without shearing forces simultaneously acting. This is as a rule the case in lacquers, casting resins, coatings, printing inks, powder coatings and the like. The pigments according to the invention can be incorporated into these systems by a known process and then display the properties according to the invention.

The partly coated pigment is stirred, with or without an added solvent, into the matrix, such as lacquer or casting resin, and the components are mixed intensively. The formulation is then applied to the substrate material to be coated (for example, by brushing, dipping, spraying (conventionally or electrostatically) or printing), so that the substrate surface is covered to the desired extent with a homogeneous film. Finally, the coating is dried under the customary conditions.

The leafing power, i.e., the floating of the pearl luster pigments to the surface of the matrix while liquid, and the leafing stability, that is to say unchanged leafing power over a relatively long period of time in the formulation, depend on the matrix used.

This property of the partly modified conductive pigment leads to a significant shift in the percolation threshold and to lower pigment concentrations for achieving adequate conductivity. In optimum cases, this can easily lead to the use of only one third to one tenth of the original percolation concentration.

The degree of pigmentation, the viscosity and the hardening properties of the matrix can likewise influence the leafing effect.

For a good leafing power, the pigmented formulation should preferably comprise not more than about 40% by weight of partly coated conductive pigment. The pigment content is preferably 0.3–30% by weight, in particular 0.5–20% by weight, based on the binder.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 44 11 807.4, are hereby incorporated by reference.

EXAMPLES

The pigments prepared according to Examples 1 to 9 below are incorporated into a casting resin formulation having the following composition:

8 g of unsaturated polyester resin (Palatal K700-1 BASF)

2 g of styrene 0.1 g of Co octanoate solution (Accelerator NL 49 S Akzo)[x])

0.6 g of cyclohexanone peroxide solution (Cyclonex 11 Akzo)[x])

x) These high contents of catalyst and accelerator were necessary because the pigments very greatly reduce the rate of reaction (gelling time<1 h).

The pigmented resin formulation is applied to glass plates in a layer 1 mm thick using a doctor blade.

In most cases, the coating hardens without tackiness. If tacky coatings are obtained, these are covered with paraffin solution (2% in benzine) and hardened in this way with exclusion of air. The paraffin layer is washed off again before measurement of the surface resistance.

For comparison, non-coated samples of the conductive pigments Minatec® 30 CM, Sacon® P 401 and Printex® XE 2 are incorporated into the above-mentioned formulation in the same manner.

The surface resistance of the resulting samples is measured with a flexible-tongue electrode. The values obtained are shown in Table 1.

TABLE 1

| Pigment According to Example | Pigment Composition | Content % by weight based on the resin | Electrical Resistance |
|---|---|---|---|
| 1 | Minatec 30 CM + 0.5% of Si 116 | 10% | 1.8 MΩ |
|   |   | 20% | 0.12 MΩ |
| 2 | Minatec 30 CM + 0.75% of Si 116 | 5% | 129 kΩ |
|   |   | 10% | 60 kΩ |
|   |   | 20% | 1.5 kΩ |
| 3 | Minatec 30 CM + 1% of Si 116 | 10% | 130 kΩ |
|   |   | 20% | 1.7 kΩ |
| 4 | Minatec 30 CM+ 0.5% of MeSil. | 10% | 17 MΩ |
| 5 | Minatec 30 CM + 1% of MeSil. | 10% | 5 MΩ |
| 6 | Minatec 30 CM + 2% of MeSil. | 10% | 0.6 MΩ |
| 7 | Sacon P 401 + 3% of Si 116 | 5% | 13 MΩ |
|   |   | 10% | 1.7 MΩ |
| 8 | Printex + 50% of Si 116 | 1% | 27 kΩ |
|   |   | 3% | 12 kΩ |
| 9 | Minatec 30 CM +1% of dioctyltin diacetate | 10% | 60 kΩ |
| Comparison | Minatec 30 CM | 30% | 2 MΩ |
|   |   | 40% | 210 Ω |
| Comparison | Sacon P 401 | 50% | 20 MΩ |
| Comparison | Printex XE 2 | 7% | 2.3 MΩ |
|   |   | 10% | 80 Ω |

Minatec 30 CM: Mica coated with $Sn/SbO_2$, manufacturer: Merck, Darmstadt, FRG
Sacon P 401: Barium sulfate-coated with $Sn/SbO_2$, manufacturer: Sachtleben, Duisburg, FRG
Printex XE 2: Conductivity carbon black, manufacturer: Degussa AG, Hanau, FRG Comparison between the partly coated and non-coated pigments shows that significantly less coated pigment is necessary to achieve approximately the same resistance. A resistance of 2 MΩ is achieved with 30% by weight of non-coated pigment Minatec 30 CM, based on the resin content. With the partly coated pigment (Example 1), however, a content of only 10%, based on the resin content, is necessary to achieve a resistance of 1.8 MΩ. This means that a better effect is even achieved with about one third of the original amount of pigment. The pigment concentrations can likewise be reduced considerably by partial coating of the conductive pigments Sacon P 401 and Printex XE 2, as Examples 7 and 8 show.

The pulverulent modified pigments of course show a reduced powder conductivity (higher resistance), since only smaller free surfaces are available on the touching pigment particles for current flow.

The following Table gives some values which have been determined with the Prof. Kleber measurement cell:

| Pigment Example | Pigment Composition | Powder resistance in the "Kleber cell" |
|---|---|---|
| 1 | Minatec 30 CM + 0.5% of Si 116 | 8000 Ω |
| 2 | Minatec 30 CM + 0.75% of Si 116 | 12,000 Ω |
| 3 | Minatec 30 CM + 1% of Si 116 | 20,000 Ω |
| 5 | Minatec 30 CM + 1.0% of MeSil. | 7000 Ω |
| Comparison | Minatec 30 CM | 980 Ω |
| 7 | Sacon P 401 + 3% of Si 116 | 3480 Ω |
| Comparison | Sacon P 401 | 640 Ω |
| 8 | Printex XE 2 + 50% of Si 116 | 280 Ω |
| Comparison | Printex XE 2 | <10 Ω |
| 10 | Minatec 30 CM + 0.4% of Si 116 + 0.4% of Si 118 | 13,000 Ω |

The pigment according to the invention has the advantage that, in comparison with a non-coated conductive pigment, a considerably smaller amount is required in order to achieve the same conductivity in the system to be used. The mechanical properties of the matrix are therefore also impaired less. Furthermore, the desired conductivity can be adjusted more readily, because the percolation threshold is not so strongly pronounced. Overall, there is thus a saving of expensive pigments and a significant reduction in costs for antistatic or conductive treatments.

Example 1

0.75 g of n-hexyldecyl-tri-ethoxysilane (Si 116 from Degussa AG, Frankfurt, FRG) is stirred with 0.75 g of $H_2O$ and 50 g of ethanol at room temperature for 0.5 hour.

150 g of Minatec 30 CM (a conductive mica pigment, coated with $Sn/SbO_2$, of particle size <15 μm from E. Merck, Darmstadt, FRG) are initially introduced into a suitable mixer (e.g., a modified dissolver). The prehydrolyzed silane solution (Si 116 solution) is added to the agitated pigment. The wetted pigment is heated to 100° C. in the course of 1 hour, while stirring. Finally, the coated pearl luster pigment is dried at 150° C. for 3 hours.

Example 2

1.125 g of n-hexyldecyl-tri-ethoxysilane (Si 116 from Degussa AG, Frankfurt, FRG) are stirred with 1.125 g of $H_2O$ and 50 g of ethanol at room temperature for 0.5 hour.

150 g of Minatec 30 CM (a conductive mica pigment, coated with $Sn/SbO_2$, of particle size <15 μm from E. Merck, Darmstadt, FRG) are initially introduced into a suitable mixer (e.g., a modified dissolver). The prehydrolyzed silane solution (Si 116 solution) is added to the agitated pigment. The wetted pigment is heated to 100° C. in the course of 1 hour, while stirring. Finally, the coated pearl luster pigment is dried at 150° C. for 3 hours.

Example 3

1.5 g of n-hexyldecyl-tri-ethoxysilane (Si 116 from Degussa AS, Frankfurt, FRG) are stirred with 1.5 g of $H_2O$ and 50 g of ethanol at room temperature for 0.5 hour.

150 g of Minatec 30 CM (a conductive mica pigment, coated with $Sn/SbO_2$, of particle size <15 μm from E.

Merck, Darmstadt, FRG) are initially introduced into a suitable mixer (e.g., a modified dissolver). The prehydrolyzed silane solution (Si 116 solution) is added to the agitated pigment. The wetted pigment is heated to 100° C. in the course of 1 hour, while stirring. Finally, the coated pearl luster pigment is dried at 150° C. for 3 hours.

Example 4

0.75 g of methyl-tri-ethoxysilane ("MeSil.") (ABCR, Karlsruhe, FRG) is stirred with 0.75 g of $H_2O$ and 50 g of ethanol at room temperature for 0.5 hour.

150 g of Minatec 30 CM (a conductive mica pigment, coated with $Sn/SbO_2$, of particle size <15 μm from E. Merck, Darmstadt, FRG) are initially introduced into a suitable mixer (e.g., a modified dissolver). The prehydrolyzed silane solution is added to the agitated pigment. The wetted pigment is heated to 100° C. in the course of 1 hour, while stirring. Finally, the coated pearl luster pigment is dried at 150° C. for 3 hours.

Example 5

1.5 g of methyl-tri-ethoxysilane (ABCR, Karlsruhe, FRG) are stirred with 1.5 g of $H_2O$ and 50 g of ethanol at room temperature for 0.5 hour.

150 g of Minatec 30 CM (a conductive mica pigment, coated with $Sn/SbO_2$, of particle size <15 μm from E. Merck, Darmstadt, FRG) are initially introduced into a suitable mixer (e.g., a modified dissolver). The prehydrolyzed silane solution is added to the agitated pigment. The wetted pigment is heated to 100° C. in the course of 1 hour, while stirring. Finally, the coated pearl luster pigment is dried at 150° C. for 3 hours.

Example 6

3 g of methyl-tri-ethoxysilane (ABCR, Karlsruhe, FRG) are stirred with 3 g of $H_2O$ and 50 g of ethanol at room temperature for 0.5 hour.

150 g of Minatec 30 CM (a conductive mica pigment, coated with $Sn/SbO_2$, of particle size <15 μm from E. Merck, Darmstadt, FRG) are initially introduced into a suitable mixer (e.g., a modified dissolver). The prehydrolyzed silane solution is added to the agitated pigment. The wetted pigment is heated to 100° C. in the course of 1 hour, while stirring. Finally, the coated pearl luster pigment is dried at 150° C. for 3 hours.

Example 7

1.5 g of n-hexyldecyl-tri-ethoxysilane (Si 116 from Degussa AG, Frankfurt, FRG) are stirred with 1.5 g of $H_2O$ and 50 g of ethanol at room temperature for 0.5 hour.

50 g of Sacon P 401 (a $BaSO_4$ coated with $Sn/SbO_2$ from Sachtleben, FRG) are initially introduced into 170 ml of ethanol in a suitable mixer (e.g., a dissolver) and are dispersed using an atomizer disc at 5 m/second. The prehydrolyzed silane solution (Si 116 solution) is added to the pigment suspension. Dispersion of the pigment is continued for 1 hour. The solvent is distilled off, while stirring the dispersion slowly. The coated pearl luster pigment is then dried at 150° C. for 3 hours.

Example 8

2.5 g of n-hexyldecyl-tri-ethoxysilane (Si 116 from Degussa AG, Frankfurt, FRG) are stirred with 2.5 g of $H_2O$ and 50 g of ethanol at room temperature for 0.5 hour.

5 g of Printex XE (a conductivity carbon black from Degussa AG, Hanau, FRG) are initially introduced into 170 ml of ethanol in a suitable mixer and are dispersed using an atomizer disc at 5 m/second. The prehydrolyzed silane solution (Si 116 solution) is added to the pigment suspension. Dispersion of the pigment is continued for 1 hour. The solvent is distilled off with further slow stirring of the dispersion. The coated pearl luster pigment is then dried at 150° C. for 3 hours.

Example 9

1 g of dioctyltin acetate is stirred with 1 g of $H_2O$ and 100 g of ethanol at room temperature for 0.5 hour.

100 g of Minatec 30 CM (a mica pigment coated with $Sn/SbO_2$ from E. Merck, Darmstadt, FRG) are initially introduced into a suitable mixer (e.g., a modified dissolver). The solution prepared in the first step is added to the agitated pigment. The wetted pigment is heated to 100° C. in the course of 1 hour, while stirring. Finally, the coated pearl luster pigment is dried at 150° C. for 3 hours.

Example 10

0.6 g n-hexyldecyl-tri-ethoxysilane (Si 116 from Degussa AG, Frankfurt, FRG) and 0.6 g n-octyldecyl-tri-ethoxysilane (Si 118 from Degussa AG, Frankfurt, FRG) are stirred with 1.2 g of $H_2O$ and 50 g of ethanol at room temperature for 0.5 hour.

150 g of Minatec 30 CM (a conductive mica pigment, coated with $Sn/SbO_2$, of particle size <15 μm from E. Merck, Darmstadt, FRG) are initially introduced into a suitable mixer (e.g., a modified dissolver). The prehydrolyzed silane solution is added to the agitated pigment. The wetted pigment is heated to 100° C. in the course of 1 hour, while stirring. Finally, the coated pearl luster pigment is dried at 150° C. for 3 hours. The powder resistance in the "Kleber cell" is 13,000 Ω.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A surface-modified pigment comprising a conductive pigment of carbon black, carbon fibers, antimony-doped tin oxide, aluminum-doped zinc oxide, fluoride-doped tin oxide or mica, kaolin or barium sulfate coated with a doped metal oxide, wherein the conductive pigment is partially coated by reaction with an organic modifying agent in an amount such that the powder electrical conductance of the surface-modified pigment is 80% or less of the powder electrical conductance of the uncoated conductive pigment but not less than $10^{-7}$ S.

2. The pigment of claim 1, prepared by:
mixing the conductive pigment with the organic modifying agent, optionally mixed with a solvent, removing the volatile reaction products and any solvent, agitating and heating to about 100° C. or more, and drying the resulting surface-modified pigment.

3. The pigment of claim 1, wherein the organic modifying agent is provided in an amount such that the powder electrical conductance of the surface-modified pigment is 50% or less of the powder electrical conductance of the uncoated conductive pigment but not less than $10^{-6}$ S.

4. The pigment according to claim 1, wherein the modifying agent is a compound having organic radicals which can be fixed on the surface of a conductive pigment.

5. The pigment according to claim 1, wherein the modifying agent is an organometallic compound of the formula I $$XR^1R^2R^3R^4 \qquad \qquad I$$

wherein the radicals $R^{1-4}$ have the following meanings:

$R^1$ and/or $R^2$ is alkyl having 1–30 atoms, wherein one or two non-adjacent $CH_2$ groups can be replaced by —CH=CH— and/or —O—, the remaining radicals $R^{1-4}$ are halogen or alkoxy having 1–20 C atoms, wherein one or two non-adjacent $CH_2$ groups can be replaced by —CH=CH—, —O—, —CO—, —COO— or OCO, and X is Si, Sn, Ti, Zr or Al, the radical $R^4$ being omitted in the case where X is Al.

6. The pigment of claim 5, wherein $R^1$ and/or $R^2$ is alkyl of 10–30 C atoms wherein one or two non-adjacent —$CH_2$— groups can be replaced by —CH=CH— and/or —O—.

7. The pigment of claim 5, wherein $R^1$ and/or $R^2$ is a decyl, undecyl, dodecyl, tridecyl, tetradecyl, pentadecyl, hexadecyl, heptadecyl, octadecyl, nonadecyl, eicosanyl, heneicosanyl, docasanyl, tricosanyl, tetracosanyl, pentacosanyl, hexacosanyl, heptacosanyl, octacosanyl, nonacosanyl, tricontanyl, 12,12-dimethyltetradecyl, 11-propyl-12-butylpentadecyl or 8,8-dimethyl-12-propyl-13-propylhexadecyl radical.

8. The pigment of claim 5, wherein the remaining radicals $R^{1-4}$ are halogen or alkoxy of 1–10 carbon atoms, wherein one or two non-adjacent —$CH_2$— groups can be replaced by —CH=CH—, —O—, —CO—, —COO— or —OCO—.

9. The pigment of claim 5, wherein the remaining radicals $R^{1-4}$ are independently selected from fluorine, chlorine, methoxy, ethoxy, propoxy, butoxy, pentoxy, hexoxy, heptoxy, octoxy, nonoxy or decoxy.

10. The pigment according to claim 1, wherein the modifying agent is a compound of the formula II $$(C_nH_{2n+1})X(OC_mH_{2m+1})_p \qquad \qquad II$$

wherein

X is Si, Sn, Ti, Zr or Al, n is 1–10, and p is 3 when X is Si, Sn, Ti and Zr, and is 2 when X is Al.

11. A coating, thermoplastic, casting resin or printing ink composition comprising a surface modified pigment according to claim 1.

12. The composition of claim 11, wherein the pigment is added to the composition while the composition is in liquid form.

13. A pigment prepared by:

mixing a conductive pigment of carbon black, carbon fibers, antimony-doped tin oxide, aluminum-doped zinc oxide, fluoride-doped tin oxide or mica, kaolin or barium sulfate coated with a doped metal oxide, with an organic modifying agent, optionally mixed with a solvent, removing the volatile reaction products and any solvent, agitating and heating to about 100° C. or more, and drying the resulting surface-modified pigment partially coated by the organic modifying agent.

14. The surface-modified pigment of claim 1, wherein the amount of the organic modifying agent for providing the partial coating is 5 to 50% of the amount needed for a complete coating.

15. The surface-modified pigment of claim 1, wherein the amount of the organic modifying agent for providing the partial coating is 10 to 30% of the amount needed for a complete coating.

16. The composition of claim 11, wherein the amount of surface-modified pigment is not more than 40% by weight of the composition.

17. The composition of claim 11, wherein the amount of surface-modified pigment is from 0.3 to 30% by weight of the composition.

18. The composition of claim 1, wherein the amount of surface-modified pigment is from 0.5 to 20% by weight of the composition.

* * * * *